Figure 1:
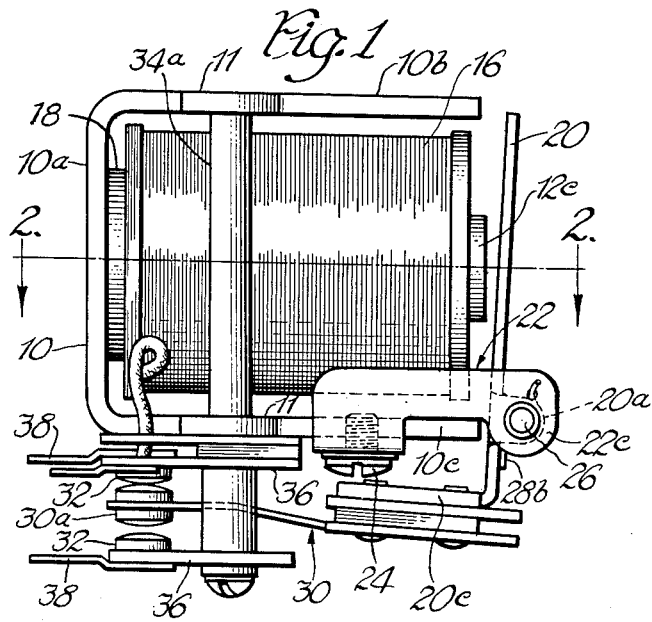

May 1, 1956

T. J. OBSZARNY 2,744,216

WIDE TEMPERATURE RANGE VIBRATION
RESISTANT RELAY OR THE LIKE
Filed Aug. 4, 1951

Inventor
Thedore J. Obszarny
by Bair, Freeman & Molinare
Attys.

United States Patent Office 2,744,216
Patented May 1, 1956

2,744,216
WIDE TEMPERATURE RANGE VIBRATION RESISTANT RELAY OR THE LIKE

Thedore J. Obszarny, Chicago, Ill., assignor to Guardian Electric Manufacturing Co., Chicago, Ill., a corporation of Illinois Application August 4, 1951, Serial No. 240,419

3 Claims. (Cl. 317—195)

The present invention relates to an improved relay or like device characterized by ability to resist shock and vibration while at the same time being capable of operating over a wide temperature range.

Relays and similar solenoid mechanisms are frequently required to operate over extended temperature ranges. In aircraft applications, for example, it is frequently necessary to provide relays operable when the craft is about to take off from a hot airfield and while other apparatus, such as engines, have raised the ambient temperature even higher. At the same time, however, the relay may be required to operate effectively when the plane is at high altitudes where temperatures are very low and the apparatus, such as engines, that otherwise raise ambient temperatures, are having their heat dissipated so rapidly that the relay partakes of the very cold outer air temperature. Also, relays may be required to operate under high temperature takeoff conditions in a hot airfield and yet operate equally well before engine starting in a cold artic airfield.

Relays subject to wide ambient temperature variations are frequently required to withstand considerable shock and vibration as well. In aircraft applications, for example, the relay may be required to operate while engines turn from a very slow speed to high speed and be immune to all the various frequencies of vibration incident to this speed range. False or erratic relay operation, occurring because of physical resonance, or near resonance, at any speed in this range may be fatal.

When the temperature variations and the vibrations or shock that must be endured by a relay or similar device are not severe, conventional constructions may be adequate. Under more adverse conditions, strengthening of the parts, better balancing, and generally improved workmanship makes possible an effective construction. However, when the temperature range becomes very great, and the shock and vibration especially severe, these expedients have proven inadequate, and a definite limit of effective operation reached.

In accordance with the present invention, it is possible to construct a relay or similar device capable of operating over an exceedingly wide temperature range and yet endure great shock and vibration. Yet the construction does not depart greatly from constructions heretofore used, does not require increased size or weight of the parts, and does not involve workmanship of impractically high quality. Relays constructed as herein described have been operated throughout the temperature range from —65° F. to 185° F. and yet have functioned positively and reliably throughout this temperature range when exposed to periodic accelerations of five times the force of gravity at frequencies up to 200 cycles per second.

It is therefore a general object of the present invention to provide a relay unit or similar device capable of operating over a wide temperature range while exposed to vibration and shock.

It is another object of the present invention to provide a temperature and shock resistant relay or similar device which embodies conventional construction and yet withstands adverse temperature, shock, and vibration conditions beyond the range of conventional units.

Still another object of the present invention is to provide a temperature, shock, and vibration resistant relay or like device which is inexpensive to construct, small in size, and yet reliable and positive in operation.

Figure 2:
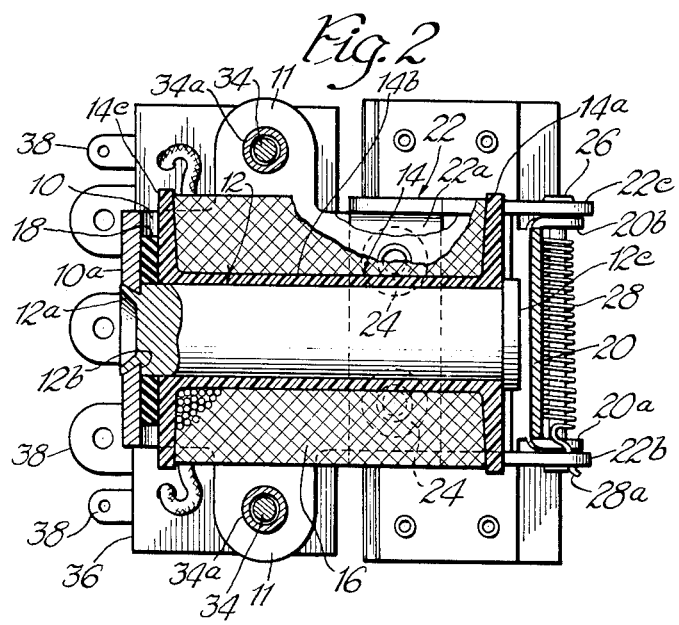

The novel features which I believe to be characteristic of my invention are set forth with particularity in the appended claims. My invention itself, however, both as to its organization and method of operation, together with further advantages and features thereof, will best be understood by reference to the following description taken in connection with the accompanying drawings, in which:

Figure 1 is a side elevational view of a relay constructed in accordance with the present invention; and Figure 2 is a cross-sectional view through axis 2—2, Figure 1.

Referring now to Figure 1, the relay comprises a U-shaped magnetic yoke 10 having a web portion 10a and opposed complementary legs 10b and 10c. This yoke may, for example, be stamped from mild steel or similar magnetic material of good mechanical strength. The web 10a has a central beveled hole which receives the elongated round core 12, Figure 2, which may, for example, be of soft iron. This core is secured to the web 10a by the peened-over connector stub 12a which is initially of diameter to fit in the hole in web 10a and, when peened-over, snugly holds the shoulder 12b against the web.

As clearly seen in Figure 2, the peened-over connector stub 12a is in the form of a reduced-diameter annular rim, extending axially forwardly and radially outwardly of the adjacent core end. The outer surface of the rim and the adjacent end of the core serve to define annularly divergent and annularly transverse abutment surfaces of limited radial extent. The frusto-conical and planar abutment surfaces formed in this way are adapted to effect generally parallel contacting engagement with the frusto-conical web surface defining the outwardly enlarged beveled hole and the transverse planar web surface provided inwardly thereof.

The core 12 has a head portion 12c at its outer or free end. The spool 14 is received over the core and, at its outer disk portion 14a, seats against the shoulder formed by the head 12c. The central or sleeve portion of the spool, 14b, fits snugly over the central cylindrical part of the core and the inner disk 14c of the core fits in spaced relation with the web 10 of the yoke as shown.

A solenoid winding 16 is wound about the spool 14 as shown, the number of turns and wire size of this winding being determined by the ampere turns and amperage for relay operation.

The spool 14 is preferably of insulating material. One suitable material is molded Bakelite (phenolformaldehyde condensation product).

In accordance with the present invention, a washer 18 is interposed or sandwiched between the inner end disk 14c of the spool 14 and the web 10a of the yoke 10. This washer is of silicone rubber and, as described hereafter, has been found to retain the parts securely in position over a wide temperature range while simultaneously suppressing and nullifying the effects of vibration and shock on the unit.

The armature of the relay is indicated at 20. It is of mild steel or similar material and extends, in closed position (not shown) across the air gap defined by the ends of the legs 10b and 10c and the head end 12c of the core 12. These ends are in aligned relation as shown so that the air gap is reduced to a small one when the flat armature seats in the closed position.

The armature 20 has a pair of complementary ears 20a and 20b, which extend laterally in aligned positions as shown. A bracket 22 overlays the leg 10c of the yoke 10 and is secured thereto at its web portion 22a, Figure 2, by the screws 24. At its ends, the bracket 22 overlies the leg 10c to form the upper and lower ears 22b and 22c which overlay and mate with the ears 20a and 20b, respectively, of the armature 20. A pin 26 with headed ends is received in aligned holes through the ears 20a, 20b, 22b and 22c to secure the armature to the yoke 10 for rocking movements in response to energization of the winding 16.

The armature 20 is biased to open position by the coil spring 28 which, at end 28a, is anchored in a hole in the ear 22b and, at the end 28b, bears against the flat face of the armature.

The armature 20 is bent at a right angle at 20c to form a mounting pad to which the contactor assembly 30 is riveted. This assembly includes a plurality of contacts 30a carried by leaf springs insulated from each other and from the armature 20. These contacts cooperate with the fixed contacts 32 to effect relay action.

The legs 10b and 10c are reinforced by the struts 34. These are received in the aligned ears 11 formed in the legs 10b and 10c and receive the sleeves 34a to anchor the legs 10b and 10c in fixed spacing in relation to each other. These struts also support the fixed contacts 32 through insulating strips 36, as shown, which strips also carry the contact lugs 38 for the various contacts and the ends of the coil 16.

The washer 18 is of the material commonly known and sold as "silicone rubber." This material is polymeric dimethyl syloxane or a similar polymer of an organo-silicon compound. It possesses the unique physical property of rendering the relay highly resistant to temperature variations and to shock and vibrations. With respect to temperature variations, this action is believed to be due to an ability of the material to take up the relative expansion or contraction of the parts at all temperatures, thereby holding the spool 14 snugly against the head end 12c of the core 12. In this respect, the material acts somewhat as a resilient element although, unlike ordinary rubber, it withstands high temperatures without deterioration. A trough, relatively hard, grade of silicone rubber is preferable for the washer 18.

While the silicone rubber appears to take up the relative expansions and contractions of the parts of the relay as caused by temperature variations, it nevertheless immunizes the relay against vibrations over a wide frequency and temperature range. Theory would indicate that if the material acts as a resilient element, thus to take up expansion and contraction of the parts, it should increase rather than suppress the movement of the spool in response to forced vibrations and, in addition, impart to the spool definite resonant frequencies in relation to the remainder of the unit. This does not occur and the material effectively performs these apparently inconsistent functions.

While I have shown and described the present invention with reference to a specific relay construction, it will be understood that the invention is not limited thereto and may be embodied in solenoid units generally which must withstand shock and vibration and exposure to wide temperature variations. It will also be understood that my invention is capable of many variations and alternative constructions, including the use of a resilient element other than silicone rubber, without departing from the true spirit and scope thereof and that I intend by the appended claims to cover all such modifications and alternative constructions falling within their true spirit and scope.

What I claim as new and desire to secure by Letters Patent of the United States is:

1. A vibration and shock resistant relay operable over a wide temperature range comprising in combination, a yoke of magnetic material having leg portions joined by a transversely extending web, a generally cylindrical magnetic core having an enlarged diameter head portion at its one end and having a connector stub at its other end, said stub being formed by a reduced diameter annular rim extending axially forwardly and radially outwardly from said other end of the core, the outer surface of said rim and the adjacent end of said core serving to define annularly divergent and annularly transverse abutment surfaces of limited radial extent, said web having an outwardly enlarged opening therethrough in axial alignment with said core, said stub extending through said web opening with said core abutment surfaces in contacting engagement with said web, the core being otherwise unsupported, a spool having end discs received over the core member, one of said discs being seated against said enlarged diameter head portion, and an insert of silicone rubber sandwiched between the other disc and the web of the yoke in compressed condition therebetween.

2. A vibration and shock resistant solenoid unit suitable for use in a relay or the like, comprising in combination, a yoke of magnetic material having leg portions joined by a transversely extending web, a generally cylindrical magnetic core having an enlarged diameter head portion at its one end and having a connector stub at its other end, said stub being formed by a reduced diameter annular rim extending axially forwardly and radially outwardly from said other end of the core, the outer surface of said rim and the adjacent end of said core serving respectively to define frusto-conical and planar abutment surfaces of limited radial extent, said web having an outwardly beveled opening therethrough in axial alignment with said core, said stub extending through said web opening with said core abutment surfaces in generally parallel engagement with said web, the core being otherwise unsupported, a spool having end discs received over the core member, one of said discs being seated against said enlarged diameter head portion, and an insert of silicone rubber sandwiched between the other discs and the web of the yoke in compressed condition therebetween.

3. A vibration and shock resistant relay operable over a wide temperature range comprising in combination, a U-shaped yoke of magnetic material having legs joined by a transversely extending web, a strut extending between the legs of the yoke and anchoring said legs in relation to each other, a generally cylindrical magnetic core having an enlarged diameter head portion at its one end and having a connector stub at its other end, said stub being formed by a reduced diameter annular rim extending axially forwardly and radially outwardly from said other end of the core, the outer surface of said rim and the adjacent end of said core serving to define annularly divergent and annularly transverse abutment surfaces of limited radial extent, said web having an outwardly beveled opening therethrough in axial alignment with said core, said stub extending through said web opening with said core abutment surfaces in generally parallel engagement with said web, the core being otherwise unsupported, a spool having end discs received over the core member, one of said discs being seated against said enlarged diameter head portion, and an insert of silicone rubber sandwiched between the other disc and the web of the yoke in compressed condition therebetween.

References Cited in the file of this patent

UNITED STATES PATENTS

| | | |
|---|---|---|
| 1,556,363 | Smith | Oct. 6, 1925 |
| 2,145,977 | Foster | Feb. 7, 1939 |
| 2,423,116 | Price | July 1, 1947 |
| 2,443,968 | Swing | June 22, 1948 |
| 2,565,697 | Odstrcil | Aug. 28, 1951 |

OTHER REFERENCES

Publication: "Dow Corning Silicones," page 11, Oct. 6, 1947.